United States Patent
Martin

[15] 3,653,351
[45] Apr. 4, 1972

[54] MAGNETIC DETECTOR

[72] Inventor: Raymond Gerald Martin, Ellicott City, Md.

[73] Assignee: The United States of America as represented by the Secretary of the Navy

[22] Filed: July 16, 1969

[21] Appl. No.: 842,198

[52] U.S. Cl. ........................114/20 R, 102/70.2 R, 102/18 R
[51] Int. Cl. ................F42b 19/34, F42c 15/08, F42c 11/09
[58] Field of Search ......................114/20, 21; 102/70.2, 18

[56] References Cited

UNITED STATES PATENTS

| | | | |
|---|---|---|---|
| 2,993,440 | 7/1961 | Chubb et al. | 102/70.2 P |
| 3,001,476 | 9/1961 | Boykin | 102/70.2 P |
| 3,113,305 | 12/1963 | Trounson et al. | 102/70.2 P |
| 3,136,944 | 6/1964 | Hafner | 102/70.2 X |
| 3,138,129 | 6/1964 | Bankston et al. | 114/20 |

Primary Examiner—Samuel Feinberg
Assistant Examiner—Thomas H. Webb
Attorney—M. G. Raskin, R. S. Sciascia, J. A. Coake and R. J. Erickson

[57] ABSTRACT

A magnetic detector for a torpedo having three rings of magnets and a pair of inducting coils alternately positioned on a torpedo body in longitudinally spaced positions thereon. Each ring of magnets and coil lies in a plane parallel to the plane of each other ring and coil and perpendicular to the longitudinal axis of the torpedo. The coils are connected in series opposition and their combined output is fed into a low frequency amplifier.

7 Claims, 7 Drawing Figures

PATENTED APR 4 1972 3,653,351

Raymond G. Martin
INVENTOR

J. O. Tresansky
ATTORNEY

BY Alvin M<sup>c</sup>Clelland
AGENT

MAGNETIC DETECTOR

BACKGROUND OF THE INVENTION

This invention relates generally to magnetic detectors and more particularly to a magnetic influence detector primarily adapted for use in underwater propelled ordnance vehicles, such as a torpedo, for detecting changes in the magnetic field acting thereon, these changes being brought about by vessels or other ferromagnetic objects which the torpedo passes close by to, or in the vicinity of, during its run.

In submarine warfare, where torpedoes are used to destroy enemy shipping and war vessels, it is not always possible to make a direct hit, yet the torpedo may pass sufficiently near its target that if it could be detonated the enemy vessel could be sunk or at least severely damaged. Various magnetic schemes of detonation to take place on the "near misses" have accordingly been continuously explored such that it now is well known in the art to which the present invention pertains to use a magnetic detecting device in combination with a suitable electroresponsive firing device for detonating the torpedo whenever the presence of a vessel is detected by a change in the earth's magnetic field brought about by the approach of the torpedo within the vicinity of the vessel.

In devices of the character described, magnetic detectors heretofore used for measuring small gradients in magnetic fields and detecting the approach of, or to, magnetic objects have commonly encountered difficulty in obtaining magnetic balance of the detecting elements. In addition, problems evolved from the effects of magnetic noise sources within the torpedo have been bothersome.

SUMMARY OF THE INVENTION

Accordingly, it is an object of the present invention to provide an improved magnetically balanced apparatus for detecting the presence of a ferromagnetic object and which will produce no signal when moved within a uniform magnetic field such as, for example, the terrestrial field of the earth when no magnetic object is disposed within the vicinity of the apparatus.

Another object of this invention is to provide a more sensitive device for underwater detecting ferromagnetic objects.

A further object of the invention is to provide a magnetic detector for use on a torpedo and shielded from magnetic noise sources therein for detecting the approach of, or to, a magnetic object.

The foregoing and other objects are attained by a device having three magnetic rings, each comprising a plurality of radially disposed elongate magnets, secured to the shell of an underwater propelled vehicle and lying in longitudinally spaced parallel planes thereon, and in which a ring-shaped field sensing, or inducting, coil is positioned on the shell between each adjacent pair of magnetic rings in a plane parallel thereto. The magnetic rings and the coils all encircle the vehicle body and have a common axis coincident with the longitudinal axis of the vehicle. In operation, the two coils are connected in series opposition and the combined output thereof is fed into low frequency amplifier.

BRIEF DESCRIPTION OF THE DRAWINGS

Still other objects and many of the attendant advantages of the present invention will be readily appreciated as the same becomes better understood by reference to the following detailed description when considered in connection with the accompanying drawings wherein like numerals of reference are employed to designate like parts throughout the several views and in which.

DESCRIPTION OF A PREFERRED EMBODIMENT

Figure 1:
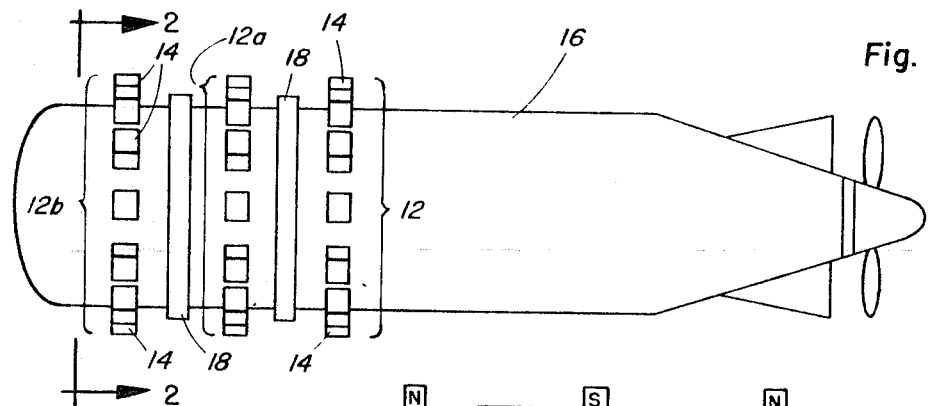
FIG. 1 is a diagrammatic top view of a torpedo illustrative of a preferred embodiment of the present invention and showing the location of the magnetic rings and detecting coils thereof.
Figure 3:
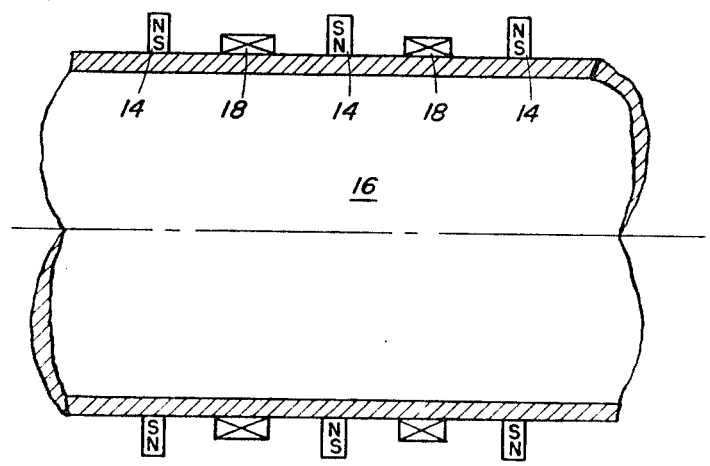
FIG. 3 is a cross-sectional view taken along the line 3—3 of FIG. 2.

Referring now in greater detail to the drawings and particularly to FIG. 1 thereof, three parallel rings 12, 12a, 12b of magnets 14 are disposed in spaced longitudinal relationship on a ferromagnetic, substantially cylindrical torpedo shell 16 near the forward end thereof. Each ring 12, 12a, 12b closely encircles the torpedo 16 and lies in a plane perpendicular to the longitudinal axis thereof. The magnets 14 of each ring, preferably being twelve in number, as shown, are bar magnets disposed radially of the longitudinal axis of the torpedo 16 at equidistant points along the ring or torpedo circumference and are orientated thereon in the same manner, that is, with all having the same pole positioned against the torpedo shell. More specifically, as may be best observed in FIG. 3, the magnets 14 of the outer or end rings 12 and 12b all have the south poles thereof positioned adjacent the torpedo, whereas the magnets of the middle ring 12a all have the north poles thereof secured to the torpedo shell.

Disposed on the torpedo body intermediate each adjacent pair of magnet rings is a detecting or inducting coil 18. Preferably, equal spacing longitudinally of the torpedo 16 is provided between each coil 18 and the magnet rings positioned respectively adjacent thereto.

Figure 4:
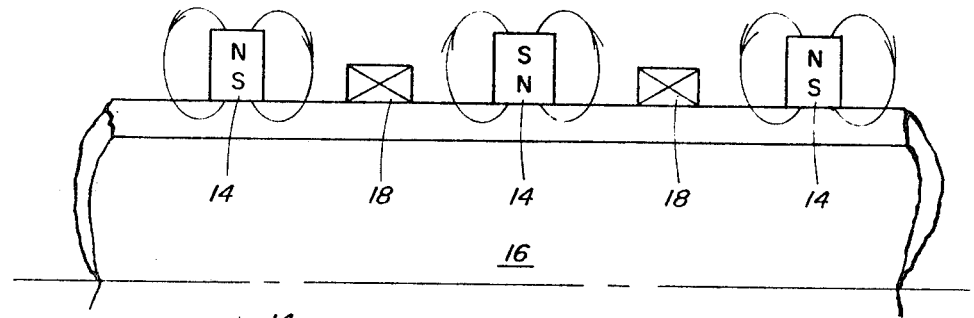
FIG. 4 is a diagrammatic illustration of the static field lines surrounding the magnets in the absence of an external ferromagnetic object.
Figure 2:
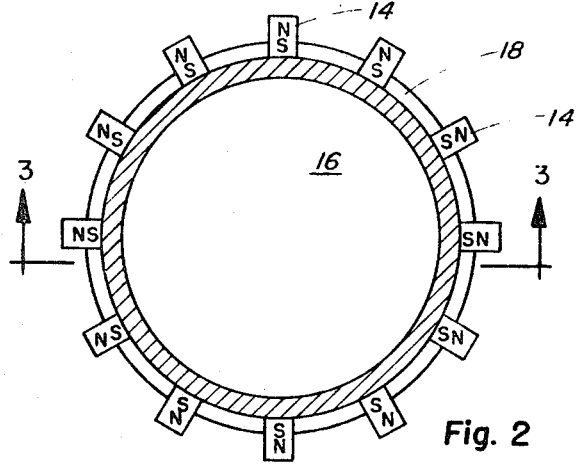
FIG. 2 is a cross-sectional front view taken along the line 2—2 of FIG. 1.
Figure 5:
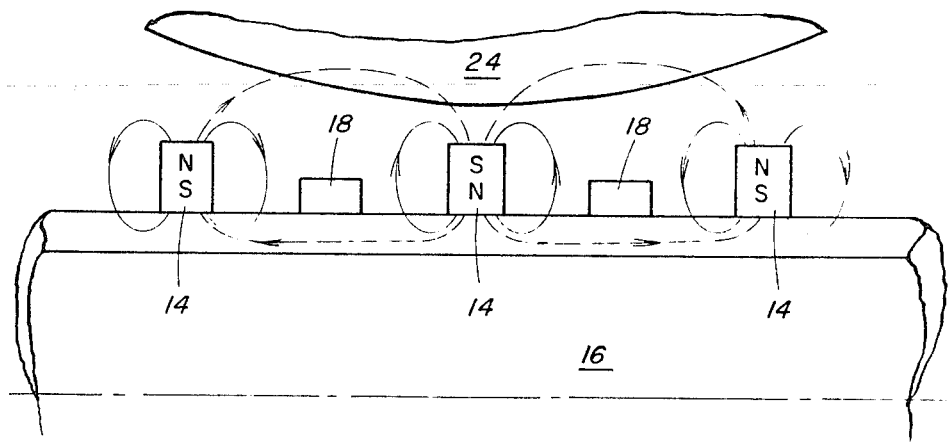
FIG. 5 is a diagrammatic illustration similar to FIG. 4 of the increase in number of the flux lines linking the coils when in the presence of a ferromagnetic object.
Figure 6:
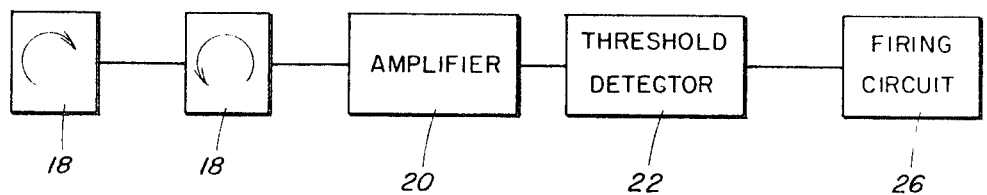
FIG. 6 is a block diagrammatic view of a circuit embodying the magnetic detector of the present invention for exploding the torpedo upon indication of the presence of a ferromagnetic object of a given magnitude and within a given range.

In actual practice, the coils 18 may be connected in series opposition and their combined output fed into a low frequency amplifier 20 incorporating a threshold detector 22 at its output in a conventional manner well known in the art and shown in black diagram form in FIG. 6. In the absence of any external ferromagnetic objects, the flux lines surrounding the magnets 14 will be arranged somewhat as illustrated in FIG. 4. Passage of the torpedo 16 close to a ferromagnetic object 24 such as, for example, an enemy submarine or shipping vessel, will produce a change in the magnetic flux lines as indicated in FIG. 5, causing an increase in the number of flux lines linking the coils 18. The changes in flux linkage for each coil induces corresponding voltage changes in the coils and inasmuch as the changes in flux linkage are in opposite directions in the two coils and the coils are connected in series opposition, the voltages will add at the input to the low frequency amplifier 20. Accordingly, given a suitably chosen amplifier gain and detection threshold level at the amplifier output, the system may readily be designed to detect the passage of the torpedo close to ferromagnetic objects within some desired predetermined ranges of distance, speed and object size for operating a suitable electroresponsive firing device, such as indicated at 26 in FIG. 6.

The arrangement of two coils in series opposition and three rings of magnets described herein is balanced with respect to the earth's magnetic field or any other uniform externally applied field. In such a region, the flux linkages of the coils 18 are equal and the potential generated in each is of the same magnitude. Theoretically, since the coils are connected in series opposition, any voltage induced in one coil will be cancelled by a corresponding voltage in the other coil, whereby no output signal will be generated and sent to the amplifier 20.

Passage of the torpedo 16 close to a non-ferromagnetic, but electrically conducting, object will induce eddy currents in the object, which in turn may produce flux changes in the coils 18. The relative magnitudes of the voltages produced in this way compared with those produced by passage near a ferromagnetic object are distinguishable if the coil and magnet dimensions are properly proportioned. A reasonable detection sensitivity to conducting non-ferromagnetic objects is thus obtainable, for example, by a unit as described herein where the flux lines from the magnets, in the absence of external objects, have a relatively high static flux linkage with the coils. On the other hand, if it were desirable to minimize the detector sensitivity to conducting, non-ferromagnetic objects, the magnets 14 and coils 18 might be spaced relatively far apart in order to minimize the static flux linkage with the coils.

Figure 7:
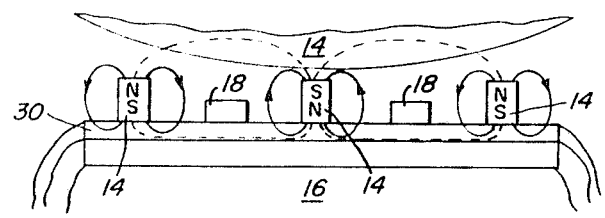
FIG. 7 is a diagrammatic illustration similar to FIGS. 4 and 5 showing a substantially cylindrical shell disposed on the torpedo intermediate the torpedo shell and the magnetic detector.

Obviously, many modifications and variations of the present invention are possible in light of the above teachings. For example, where the torpedo body has been described herein as being constructed of a ferromagnetic material for providing a return flux path and additionally shielding the detector from magnetic noise sources within the torpedo, a non-ferromagnetic torpedo shell may be employed and a separate additional shell of ferromagnetic material 30 interposed between the torpedo body and the magnet-coil detector arrangement as shown in FIG. 7. Omission of the return flux path entirely might be expected to reduce the sensitivity of the detector somewhat, but otherwise it would not change the basic operation of the detector. It is therefore to be understood that within the scope of the appended claims the invention may be practiced otherwise than as specifically described.

What is claimed is:

1. In combination with a torpedo, a magnetic detector for detecting disturbances in a magnetic field, comprising:

three parallel rings of radially disposed magnets secured to the substantially cylindrical shell of a torpedo at spaced longitudinal positions thereon;

each of said rings comprising a plurality of magnets equally spaced about the circumference thereof and lying on the plane perpendicular to the longitudinal axis of said torpedo;

a pair of ring-shaped inductive coils connectable in series opposition, each being secured to the torpedo shell intermediate a different pair of adjacently disposed said rings of magnets.

2. The combination set forth in claim 1 wherein said torpedo shell is constructed of a ferromagnetic material.

3. The combination set forth in claim 1 wherein said torpedo shell is constructed of a non-ferromagnetic material and further comprising, a substantially cylindrical shell disposed on said torpedo intermediate said torpedo shell and said magnetic detector.

4. The combination set forth in claim 1 wherein each of said rings includes 12 magnets.

5. The combination set forth in claim 1 wherein all the magnets in each ring of magnets are secured to said torpedo with the same poles thereof disposed adjacent the torpedo shell.

6. The combination set forth in claim 5 wherein the magnets in each of the end or outermost disposed rings are disposed with the same poles positioned against the torpedo shell, and the magnets in the intermediate ring are disposed with the opposite pole positioned against the torpedo shell.

7. The combination set forth in claim 1 further comprising means for amplifying the outputs of said coils and connecting said outputs to a torpedo firing circuit.

* * * * *